United States Patent [19]

Dammann et al.

[11] Patent Number: 5,232,531
[45] Date of Patent: Aug. 3, 1993

[54] ADHESIVE FOR BONDING EPDM RUBBER ROOFING MEMBRANE AND BONDING METHOD EMPLOYING SAME

[75] Inventors: Laurence G. Dammann, Westerville; John W. Fieldhouse, Ashland; Michael C. Clingerman, Columbus; Hsienkun Tsai, Dublin, all of Ohio

[73] Assignee: Ashland Oil, Inc., Russell, Ky.

[21] Appl. No.: 747,081

[22] Filed: Aug. 19, 1991

[51] Int. Cl.⁵ .............................................. B31F 5/00
[52] U.S. Cl. ................................ 156/157; 156/331.4; 156/333; 524/476; 524/509; 525/133
[58] Field of Search ............... 524/476, 509; 525/133; 156/333, 157, 331.4

[56] References Cited

U.S. PATENT DOCUMENTS

| | | | |
|---|---|---|---|
| 3,597,377 | 8/1971 | Berejka et al. | 525/133 |
| 3,674,735 | 7/1972 | Callan | 524/509 |
| 3,704,274 | 11/1972 | Callan . | |
| 4,125,491 | 11/1978 | Gorman | 524/476 |
| 4,501,842 | 2/1985 | Chmiel et al. | 524/432 |
| 4,603,164 | 7/1986 | Chmiel . | |
| 4,851,462 | 7/1989 | Chmiel . | |
| 4,881,996 | 11/1989 | Nussbaum . | |

OTHER PUBLICATIONS

Hardman Product Literature.
Polysar MSDS.
Hercules Product Data Sheet.

Primary Examiner—John J. Gallagher
Attorney, Agent, or Firm—Mary E. Picken

[57] ABSTRACT

This invention relates to an adhesive for use with elastomeric substrates such as EPDM roofing materials, a method for splicing elastomeric substrates using splice adhesives and a laminate. The adhesive of this invention combines butyl rubber crosslinked after polymerization, halogenated butyl rubber, tackifying resin, and an isocyanate partially reacted with a diamine in a shelf stable product which rapidly forms strong bonds resistant to heat and humidity.

8 Claims, No Drawings

ADHESIVE FOR BONDING EPDM RUBBER ROOFING MEMBRANE AND BONDING METHOD EMPLOYING SAME

This invention relates to adhesives based on butyl rubber for use in laminating EPDM roofing membrane which maintain excellent shelf stability while rapidly forming strong bonds resistant to heat and humidity within 30 minutes of application.

BACKGROUND OF THE INVENTION

Heretofore adhesives used to attach sheets of roofing membranes to each other have been made from various components. U.S. Pat. No. 4,851,462 describes an adhesive made from a halogenated butyl rubber crosslinked during polymerization with divinyl benzene, a high softening point thermoplastic resin and a solvent. U.S. Pat. No. 4,603,164 describes an adhesive made from halogenated butyl rubber, butyl rubber crosslinked during polymerization with 1,4 divinyl benzene or similar unsaturated crosslinking compounds, a high softening point hydrocarbon resin, optional ethylene-propylene-non-conjugated diene terpolymer and aliphatic polyisocyanate.

U.S. Pat. No. 4,501,842 describes an adhesive made from halogenated butyl rubber, pre-crosslinked butyl rubber made by incorporating a crosslinking agent during polymerization of the butyl rubber, styrene/ethylene butylene/styrene block thermoplastic rubber, a thermoplastic petroleum based hydrocarbon feedstock derived aliphatic monomer resin, and an aliphatic isocyanate. U.S. Pat. No. 4,881,996 relates to a butyl splice adhesive made of halogenated pre-crosslinked isobutylene-isoprene copolymer butyl rubber, thermoplastic copolymer, hydrocarbon resin, quinoid cure mixture and solvent.

The installers of EPDM rubber membrane roofs require that the roofing adhesives have a number of rigorous physical characteristics which facilitate their application and durability. These include useful application viscosity, low Weissenberg values (Weissenberg values are a measure of brushability and flowability; the lower the number for an adhesive, the more easily it will apply), peel performance at one hour of at least one pound per linear inch (pli) and strength of 24 hours or more after passing the Dead Weight Shear Test (DWST) at 158° F. (70° C.) in an ambient humidity oven. DWST is meant to simulate summer conditions on a hot roof. When the adhesive passes such stringent tests it can be efficiently applied and will not fail during the crucial early moments while workers are still walking on the bonded membranes or large fluctuations in temperature occur.

The adhesives previously developed often fail these rigorous tests and sometimes even form unusable gels in their containers before they can be used. It would certainly be desirable to develop an adhesive which would pass these tests consistently and be storage stable as well.

OBJECT OF THE INVENTION

It is accordingly an object of this invention to provide an adhesive for cured EPDM roofing materials which exhibits useful shelf life, good green strength and good durability.

In accordance with the present invention an adhesive is provided for EPDM roofing which exhibits useful shelf life, good green strength and good durability.

In one embodiment this invention relates to a laminate of EPDM roofing membranes or other elastomeric substrates adhered together with an adhesive comprising a butyl rubber crosslinked after polymerization, a halogenated butyl rubber, a tackifying resin, and an isocyanate which has been partially reacted with a diamine.

In another embodiment this invention is a roofing adhesive comprising a butyl rubber crosslinked after polymerization, a halogenated butyl rubber, a tackifying resin, and an isocyanate which has been partially reacted with a diamine.

In a further embodiment this invention is a method of adhering elastomeric substrates comprising the steps of applying to said elastomeric substrates an adhesive comprising a butyl rubber crosslinked after polymerization, a halogenated butyl rubber, a tackifying resin, and an isocyanate which has been partially reacted with a diamine, and joining said substrates.

DETAILED DESCRIPTION OF THE INVENTION

The first ingredient of the adhesive of this invention is a butyl rubber crosslinked after polymerization ("postcrosslinked" butyl rubber). These rubbers include the Kalar butyl rubbers crosslinked after polymerization with phenolic resin available from Hardman, Belleville, N.J. According to the manufacturer, this crosslinking is accomplished by reacting a methylol functional phenolic resin with the fully polymerized butyl rubber at a level which is less than that required for full crosslinking to occur. The process of making these resin-containing butyl rubbers is described in U.S. Pat. No. 3,704,274. This ingredient provides both hot shear strength and hot peel strength to the adhesive.

Butyl rubber may be the major component of this adhesive.

The second ingredient of the adhesive of this invention is halogenated butyl rubber which has not been crosslinked. Among useful halogenated butyl rubbers are Polysar X-2 bromobutyl rubber and Exxon 2030, 2222, 2230, 2233, 2244 and 2255 bromobutyl rubbers and Polysar 1240 and 1255 chlorobutyl rubbers and Exxon 1065, 1066 and 1068 chlorobutyl rubbers. The most preferred is bromobutyl rubber. This ingredient wets the EPDM surface and gives good long-term peel values. From 20 to 400 parts halobutyl rubber are used per 100 parts postcrosslinked butyl rubber in the adhesive of this invention.

Halogenated butyl rubber may be the minor component of this adhesive.

The third ingredient of the adhesive of this invention is a tackifying resin. Any compatible tackifier resin with a softening point above 100° C. may be used. Among the useful tackifying resins are Piccovar AB 180 resin available from Hercules, Inc., Wilmington, Del., Nevtac 130 resin available from Neville Chemical Co., Pittsburgh, Pa., Piccotac 115 resin available from Hercules, Inc., Beta Tac 160 resin available from Arizona Chemical Co., Panama City, Fla. and Piccofyn A-135 resin available from Hercules, Inc. The most preferred tackifier resin is Piccovar AB 180 resin with a softening point of 175°–181° C., an acid number of less than 1 and a bromine number of 16.0–20.0 used at from 10 to 400 parts per hundred parts postcrosslinked butyl rubber.

The fourth ingredient of the adhesive of this invention is an isocyanate partially reacted with a diamine. Among the useful isocyanates are toluene diisocyanate (TDI), 4,4'-diphenylmethane diisocyanate (MDI), isophorone diisocyanate (IPDI), 1,6 hexamethane diisocyanate (HDI), bis(4-isocyanatocyclohexyl) methane, polymethylene polyphenyl isocyanates such as Mondur MR and Mondur MRS from Mobay Chemical Corporation, Pittsburgh, Pa., m-xylylene diisocyanate (MXDI), m-tetramethylxylene diisocyanate, (m-TMXDI), 1,3-bis (isocyanato methyl) cyclohexane (1,3 BIC), trimethyl hexamethylene diisocyanate (TMHDI), biuret derivative of 1,6-hexamethylene diisocyanate, trimer derivative of 1,6-hexamethylene diisocyanate, and the trimer derivative of isophorone diisocyanate. Also included are polyisocyanate prepolymers based on diphenylmethane diisocyanate such as Mondur XP-743 and Mondur XP-744 available from Mobay Chemical Corporation. The most preferred isocyanate is an aliphatic isocyanate, isophorone diisocyanate, and the isophorone diisocyanate trimer available from Huls America, Piscataway, N.J., as T-1890 diisocyanate. The useful diamines include isophorone diamine, ethylene diamine, propylene diamine, hexamethylene diamine, dicyclohexylmethane diamine, cyclohexane diamine, piperazine, 1,12 dodecane diamine, amine-terminated polypropylene glycols available as Jeffamine D-Series polyoxyalkylamines from Texaco Chemical Co., Houston, Tex., N,N'-dialkyl-m-phenylene diamine and N,N'-dialkyl, 4-(4'-aminophenylmethyl) aniline available as Unilink diamines from UDP, Des Plaines, Ill., diethyltoluene diamine, N,N'-ditertiarybutyl ethylene diamine, and hydrazine, or mixtures thereof. The preferred diamine is isophorone diamine. From 0.5 to 5 parts isophorone diamine are reacted with 5 to 20 parts T-1890 isophorone diisocyanate trimer and used with 100 parts postcrosslinked butyl rubber, 20 to 400 parts halobutyl rubber and 10 to 400 parts tackifier resin to prepare the adhesive of this invention.

Further, optional, ingredients in the adhesive of this invention include zinc resinate, postcrosslinked halobutyl rubber such as Kalar 5270 rubber from Hardman, Bellville, N.J., star-branched halo butyl rubbers such as MDB 86-6, MDB90-5, and MDB-88-4 halobutyl rubber from Exxon Chemical, Houston, Tex., carbon black dispersion, curatives such as ZnO, hexamethylene diamine carbamate available as DiAK No 1 from Dupont, Wilmington, Del., MgO, sulfur, sulfur based accelerators, reactive phenolic resins, antioxidants, and molecular sieves.

Useful elastomeric substrates in the practice of this invention include vulcanized or unvulcanized ethylene-propylene-diene monomer (EPDM) rubber, cured natural rubber (NR), vulcanized or unvulcanized neoprene rubber, and cured butyl rubber (IIR). Most often, the adhesive of this invention is used as a splice adhesive with roofing materials made from vulcanized EPDM rubber sheets.

Solvents useful in the adhesive of this invention include toluene, xylene, ethyl benzene, heptane, hexane, cyclohexane, mineral spirits, and Lacolene solvent available from Ashland Chemical, Inc., Columbus, Ohio and mixtures thereof. A blend of toluene/xylene/hexane at 11.2/1/3.2 provides a useful open time yet evaporates completely so that solvent is not entrapped when the bond is made, avoiding the lower adhesion strengths experienced when solvent is entrapped.

Proper milling of the postcrosslinked butyl rubbers is key to producing a high performance butyl splice adhesive. The rubber must be milled sufficiently so that it is soluble in the organic solvents, yet not overmilled to a point where the inherent cohesive strength of the crosslinked rubber is degraded and lower green strength is observed. A two-roll milling time of about 15 minutes gives a rubber with good adhesive performance. Alternatively, the postcrosslinked butyl rubber can be processed in a Banbury mixer.

The following Examples show how the present invention can be practiced but should not be construed as limiting. In this application, all percentages and proportions are by weight. Also, all citations herein are expressly incorporated herein by reference.

The following Example 1 illustrates preparation of the adhesive of this invention.

EXAMPLE 1

2-roll milled Kalar 21111 butyl rubber, crosslinked after polymerization with phenolic resin, in the amount of 70 parts was solubilized with 30 parts Polysar X2 bromobutyl rubber, 75 parts Piccovar AB-180 hydrocarbon resin, 1 part Irganox 1010 antioxidant, and 5 parts of 5 A molecular sieves in 431.0 parts toluene, 35.4 parts xylene and 124.0 parts hexane. Next, 14.3 parts of T-1890E isophorone diisocyanate trimer (70% solids in n-butyl acetate) was added followed by 1.5 parts of isophorone diamine. The adhesive was mixed for two hours, then stored in lined metal cans. Table 1 summarizes the various comparative formulations studied along with the Adhesive 1 of this invention.

Adhesive 2 was prepared following U.S. Pat. No. 4,603,164, where at Columns 3 and 4, a preparation lacking ethylene-propylene-non-conjugated diene terpolymer is described. The pre-crosslinked butyl rubber ingredient of U.S. Pat. No. 4,603,164 required both 2-roll milling and extrusion before it could be dissolved in contrast to the butyl rubber crosslinked after polymerization of this invention as used in Example 1 which was soluble after merely 2-roll milling, needing no extrusion in order to dissolve.

Adhesive 3 omits the diamine ingredient from the formulation of this invention.

Adhesive 4 uses butyl rubber precrosslinked during polymerization instead of the butyl rubber crosslinked after polymerization ingredient of the adhesive of this invention.

Adhesives 5 and 6 provide further comparisons.

The following Example 2 illustrates the procedures used in evaluating the splice adhesive of this invention.

EXAMPLE 2

Test samples of ethylene propylene diene monomer (EPDM) sheet roofing stock sold by Firestone Building Products, Indianapolis, Ind. under the RubberGard trademark were prepared by washing the surface of 7 inch by 8 inch of 0.045 inch thick pieces with a cloth soaked in Shell Sol B solvent (Shell Oil Company, Houston, Tex.). A uniform adhesive coating was brushed onto the EPDM pieces (about 12 cc of adhesive) and allowed to dry 45 minutes at 25° C. T-peel adhesion samples were prepared by joining one entire adhesive coated piece with the adhesive coated side of a second piece, followed by use of a hand roller to form a laminate. The adhesion samples were allowed to stand undisturbed for 24 hours at 25° C. Adhesion testing was then done on an Instron tensile tester with the jaw speed set at 2 inches/minute. Testing was done at 25° C. Samples were also stored in air at 70° C. and in water at 70° C. after the initial 24 hours 25° C. conditioning period. Adhesion testing was then done as described using the Instron tester. For the Dead Weight Shear Test (DWST) 7 inch by 8 inch pieces of the Firestone Rubberguard sheet roofing stock were prepared as above. A uniform adhesive coating was brushed onto a 1 inch strip at the edge of these pieces and allowed to dry for 30 minutes at 25° C. DWST samples were prepared by mating 2 of these pieces along their adhesive coated edges in such a fashion as to make shear test samples. One inch strips were cut from the coated samples for testing. After 30 minutes closed time, 2 test specimens were hung in a 70° C. ambient humidity oven with a 300 g weight attached to each. An adhesive passes if both test specimens hang for more than 24 hours at 70° C.

TABLE I

| Adhesive | ADHESIVE FORMULATIONS | | | | | |
|---|---|---|---|---|---|---|
|  | 1 | 2 | 3 | 4 | 5 | 6 |
| A | 30 | 30 | 30 | 30 | 30 | 30 |
| B | 70 | — | 70 | — | 70 | — |
| C | — | 70 | — | 70 | — | 70 |
| D | 75 | 75 | 75 | 75 | 75 | 75 |
| E | 1 | 1 | 1 | 1 | 1 | 1 |
| F | 5 | 5 | 5 | 5 | 5 | 5 |
| Toluene | 431.0 | 425.5 | 427.7 | 431.0 | 428.8 | 428.8 |
| Xylene | 35.4 | 35.0 | 35.4 | 35.4 | 35.3 | 35.3 |
| Hexane | 124.0 | 122.4 | 123.0 | 124.0 | 123.3 | 123.3 |
| G | 14.3 | — | 14.3 | 14.3 | — | — |
| H | — | 13.3 | — | — | 13.3 | 13.3 |
| I | 1.5 | — | — | 1.5 | 1.5 | 1.5 |

A) Polysar X2 halogenated butyl rubber
B) Kalar 21111 butyl rubber crosslinked after polymerization with phenolic resin - milled before dissolving
C) Polysar XL 10,000 butyl rubber precrosslinked during polymerization 2-roll milled and extruded before dissolving
D) Piccovar AB-180 hydrocarbon resin
E) Irganox 101 antioxidant
F) 5A molecular sieves Union Carbide, Danbury CT
G) T1890E isophorone aliphatic trimer diisocyanate 70% solids in n-butyl acetate
H) Desmodur N-75 hexamethylene aliphatic diisocyanate adduct
I) Iosphorone diamine Tables 2, 3, 4 and 5 report the viscosities, Weissenberg Values, Peel Performance and DWST Performance of the Adhesive Formulations of Example 1 and Table 1. Each result is the average of five tests.

TABLE 2

| | VISCOSITIES (cps) #35 Spindle, 10 RPM | | | | | |
|---|---|---|---|---|---|---|
|  | −1 | −2 | −3 | −4 | −5 | −6 |
| Initial | 7150 | 5080 | 3210 | 9540 | 6180 | 20,000+ |
| 24 Hrs @ 50° C. | 7280 | Gel | 2940 | Gel | Gel | Gel |
| 1 Week 50° C. | 26,000 | — | 3770 | — | — | — |

TABLE 3

| | WEISSENBERG VALUES[1] | | | | | |
|---|---|---|---|---|---|---|
|  | −1 | −2 | −3 | −4 | −5 | −6 |
| Initial | 38 | 8 | 10 | 15 | 81 | 50 |
| 24 Hrs @ 50° C. | 76 | Gel | 12 | Gel | Gel | Gel |
| 1 Week 50° C. | 116 | — | 82 | — | — | — |

[1]Millimeters rise on a Weissenberg Spindle when rotated in the adhesive at 500 rpm. Weissenberg Spindles are available from Diano Corporation, Louisville, Kentucky.

TABLE 4

| PEEL PERFORMANCE[2] | |
|---|---|
| (Pli, Instron 1011, 2 inches per minute) | |
| 1 | 2 |

RT @ RT

TABLE 4-continued

| PEEL PERFORMANCE[2] | |
|---|---|
| (Pli, Instron 1011, 2 inches per minute) | |
| 1 | 2 |
| 1 Hour | 2.7 C | 2.5 C |
| 1 Day | 5.4 M | 5.3 M |
| 1 Week | 2.8 A | 2.9 A |
| 1 Month | — | |
| 158 @ RT | | |
| 1 Hour | 3.4 C | 3.0 C |
| 1 Day | 4.9 C | 3.7 C |
| 1 Week | 4.6 C | 4.3 C |
| 1 Month | | |
| 158, H₂O @ RT | | |
| 1 Day | 3.5 A | 4.0 A |
| 1 Week | 5.7 A | 5.5 A |
| 1 Month | | |
| RT @ 158 | | |
| 1 Day | 1.1 C | 1.3 C |
| 1 Week | 2.8 A | 3.6 A |
| 1 Month | | |
| 158 @ 158 | | |
| 1 Day | 1.8 C | 1.7 C |
| 1 Week | 3.5 C | 2.4 C |
| 1 Month | | |

Failure modes are:
C = cohesive
A = adhesive
M = adhesive/cohesive mixed
[2]Adhesives 3, 4, 5 and 6 were gelled and could not be evaluated

TABLE 5

| DWST PERFORMANCE Ambient Humidity Oven @ 70° C. Colonial Membrane | | |
|---|---|---|
| Closed Time | −1 | −3 |
| 30' (shear strength, sag, distance | Pass (11 psi, 0 mm) | F |
| 2 Hours | — | F |
| 6 Hours | — | Pass (10 psi, 1 mm) |
| 18 Hours | — | Pass (22 psi, 0 mm) |

Only Adhesives 1 and 3 were shown to be useful as the others formed unuseable gels. Only the adhesive of this invention, Adhesive 1, was able to pass the DWST test at the required 30 minute closed time.

EXAMPLE 3 (C5179-82)

Kalar 21112 rubber, crosslinked after polymerization with phenolic resin, in the amount of 70 parts was solubilized with 30 parts Polysar X2 bromobutyl rubber, 75 parts Piccovar AB 180 hydrocarbon resin, 2 parts Irganox B-225 antioxidant, 0.5 part Agerite Stalite S, and 5 parts molecular sieves in 423 parts toluene and 38.6 parts xylene. This solution was mixed until smooth and 122 parts hexane was added. Next, 10 parts of isophorone diisocyanate trimer T-1890, predissolved in 4.3 parts toluene was added, followed by 1.5 parts isophorone diamine predissolved in 3.5 parts of toluene. This adhesive was mixed for ¼ hour then stored in lined metal cans. DWST specimens were prepared as in Example 2 but with ethylene propylenediene (EPDM) clean sheet stock sold by Colonial Rubber Works, Dyersberg, Tenn. The adhesive passed DWST after 30 minutes closed time. The initial viscosity of this adhesive was 3200 cps. After storage for one month at 50° C. the viscosity was 3760 cps, still very smooth and workable.

We claim:
1. A method of adhering elastomeric substrates comprising the steps of:

a) coating one edge of a first elastomeric substrate with an adhesive comprising:
   a butyl rubber crosslinked after polymerization,
   a halogenated butyl rubber,
   a hydrocarbon tackifying resin, and
   a diamine reacted with an isocyanate, and
b) joining said first adhesive coated substrate to a second elastomeric substrate.

2. The method of claim 1 wherein said butyl rubber is crosslinked with a phenolic resin.

3. The method of claim 2 wherein said isocyanate is an aliphatic isocyanate.

4. The method of claim 3 wherein said diamine is isophorone diamine.

5. The method of claim 4 wherein said tackifying resin has a softening point between 175° and 181° C.

6. The method of claim 5 wherein said adhesive comprises:
   100 parts butyl rubber,
   20 to 400 parts halogenated butyl rubber,
   10 to 400 parts tackifying resin, and
   5 to 60 parts isocyanate partially reacted with 0.5 to 25 parts diamine.

7. The method of claim 6 wherein said adhesive comprises
   a) 100 parts of a rubber mixture wherein a butyl rubber partially crosslinked after polymerization is the major component and a halogenated butyl rubber is the minor component,
   b) 65 to 85 parts tackifying resin and the reaction product of,
   c) from 5 to 19 parts isocyanate, and
   d) 0.5 to 6.0 parts diamine.

8. The method of claim 7 wherein said adhesive comprises:
   70 parts butyl rubber,
   30 parts halogenated butyl rubber,
   75 parts tackifying resin and the reaction product of,
   10 parts isocyanate, and
   1.5 parts diamine.

* * * * *